United States Patent [19]

Ligon, Sr. et al.

[11] Patent Number: 5,609,394
[45] Date of Patent: Mar. 11, 1997

[54] FOUR-WAY LUMBAR SUPPORT

[75] Inventors: James T. Ligon, Sr., Almont; Stephen P. Porter, Imlay City, both of Mich.

[73] Assignee: Ligon Brothers Manufacturing Company, Almont, Mich.

[21] Appl. No.: 606,257

[22] Filed: Feb. 23, 1996

[51] Int. Cl.⁶ ..................................................... A47C 3/025
[52] U.S. Cl. ..................................... 297/284.4; 297/284.1
[58] Field of Search ............................ 297/284.4, 284.7, 297/284.8, 284.1

[56] References Cited

U.S. PATENT DOCUMENTS

| | | |
|---|---|---|
| 1,182,854 | 5/1916 | Poler . |
| 2,756,809 | 7/1956 | Endresen . |
| 2,843,195 | 7/1958 | Barvaeus . |
| 2,942,651 | 6/1960 | Binding . |
| 3,378,299 | 4/1968 | Sandor . |
| 3,724,144 | 4/1973 | Schuster . |
| 3,762,769 | 10/1973 | Poschl . |
| 4,014,422 | 3/1977 | Morishita . |
| 4,153,293 | 5/1979 | Sheldon . |
| 4,156,544 | 5/1979 | Swenson et al. . |
| 4,182,533 | 1/1980 | Arndt et al. ............... 297/284.4 |
| 4,316,631 | 2/1982 | Lenz et al. ............... 297/284.1 |
| 4,354,709 | 10/1982 | Schuster . |
| 4,449,751 | 5/1984 | Murphy et al. . |
| 4,452,485 | 6/1984 | Schuster . |
| 4,494,709 | 1/1985 | Takada . |
| 4,556,251 | 12/1985 | Takagi . |
| 4,561,606 | 12/1985 | Sakakibara et al. . |
| 4,564,235 | 1/1986 | Hatsutta et al. . |
| 4,565,406 | 1/1986 | Suzuki . |
| 4,576,410 | 3/1986 | Hattori . |
| 4,601,514 | 7/1986 | Meiller . |
| 4,632,454 | 12/1986 | Naert . |
| 4,679,848 | 7/1987 | Spierings . |
| 4,880,271 | 11/1989 | Graves . |
| 4,915,448 | 4/1990 | Morgenstern . |
| 5,005,904 | 4/1991 | Clemens et al. . |
| 5,050,930 | 9/1991 | Schuster et al. . |
| 5,076,643 | 12/1991 | Colasanti et al. . |
| 5,088,790 | 2/1992 | Wainwright et al. . |
| 5,137,329 | 8/1992 | Neale . |
| 5,186,412 | 2/1993 | Park . |
| 5,197,780 | 3/1993 | Coughlin . |
| 5,217,278 | 6/1993 | Harrison et al. . |

FOREIGN PATENT DOCUMENTS

| | | | |
|---|---|---|---|
| 2541559 | 3/1977 | Germany | ......................... 297/284.8 |
| 2064419 | 7/1979 | Germany . | |

*Primary Examiner*—Milton Nelson, Jr.
*Attorney, Agent, or Firm*—Dykema Gossett PLLC

[57] ABSTRACT

An adjustable lumbar support mechanism includes a flexible support member, a device for longitudinally subtending the support member, an apex shift linkage, and a loading device engaging the apex shift linkage. The flexible support member has oppositely disposed first and second longitudinal ends. The device for longitudinally subtending the support member is disposed between the first longitudinal end and the second longitudinal end and causes the support member to arch outwardly to define an apex engaging a users back. The apex shift linkage includes a first shift link and a second shift link. The first shift link has a first end pivotably connected to the flexible support member proximate to the first longitudinal end. The second shift link is pivotably connected on a first end thereof to the flexible support at a point between the second longitudinal end and the first end of the apex shift link. The second shift link is also pivotably connected to the first shift link at a hinge point wherein the first shift link and the second shift link define an obtuse angle therebetween. The loading device engages one of the first shift link and the second shift link at a load point wherein applying a load at the load point in a direction toward the flexible support mechanism tends to shift the apex toward the second longitudinal end.

12 Claims, 4 Drawing Sheets

5,609,394

FOUR-WAY LUMBAR SUPPORT

FIELD OF THE INVENTION

The present invention relates to lower back or lumbar supports for seats, and more particularly to adjustable lumbar supports used in seatbacks.

BACKGROUND OF THE INVENTION

Most known adjustable lumbar supports provide an in and out, or two-way adjustment of a peak or apex of the lumbar support which supports the lower back of a seat occupant. The apex tends to remain at a fixed vertical location with respect to the seatback. Unfortunately, the in and out adjustment provided may be inadequate for those individuals who optimally require back support at a point either higher or lower than the location of the apex. A four-way lumbar support provides not only the in and out movement of the apex, but also provides up and down movement of the apex.

It is desired to provide a four-way lumbar support providing both in and out and up and down apex movement which is simple in design for ease of manufacture and assembly. It is further desired to provide a four-way lumbar support which is easy to use and provides optimal back support in a seatback for a wide range of individuals.

SUMMARY OF THE INVENTION

An adjustable lumbar support mechanism includes a flexible support member, means for longitudinally subtending the support member, an apex shift linkage, and a loading means engaging the apex shift linkage. The flexible support member has oppositely disposed first and second longitudinal ends. The means for longitudinally subtending the support member is disposed between the first longitudinal end and the second longitudinal end and causes the support member to arch outwardly to define an apex engaging a users back. The apex shift linkage includes a first shift link and a second shift link. The first shift link has a first end pivotably connected to the flexible support member proximate to the first longitudinal end. The second shift link is pivotably connected on a first end thereof to the flexible support at a point between the second longitudinal end and the first end of the apex shift link. The second shift link is also pivotably connected to the first shift link at a hinge point wherein the first shift link and the second shift link define an obtuse angle therebetween. The loading means engages one of the first shift link and the second shift link at a load point wherein applying a load at the load point in a direction toward the flexible support mechanism tends to shift the apex toward the second longitudinal end.

The four-way lumbar support disclosed is simple in design, making it easy to manufacture and assemble. The lumbar support is also easy to use and provides optimal back support in a seatback for a wide range of individuals.

These and other features of the present invention will become apparent to one skilled in the art from the following detailed description and the appended drawings.

DETAILED DESCRIPTION OF A PREFERRED EMBODIMENT

Figure 1:
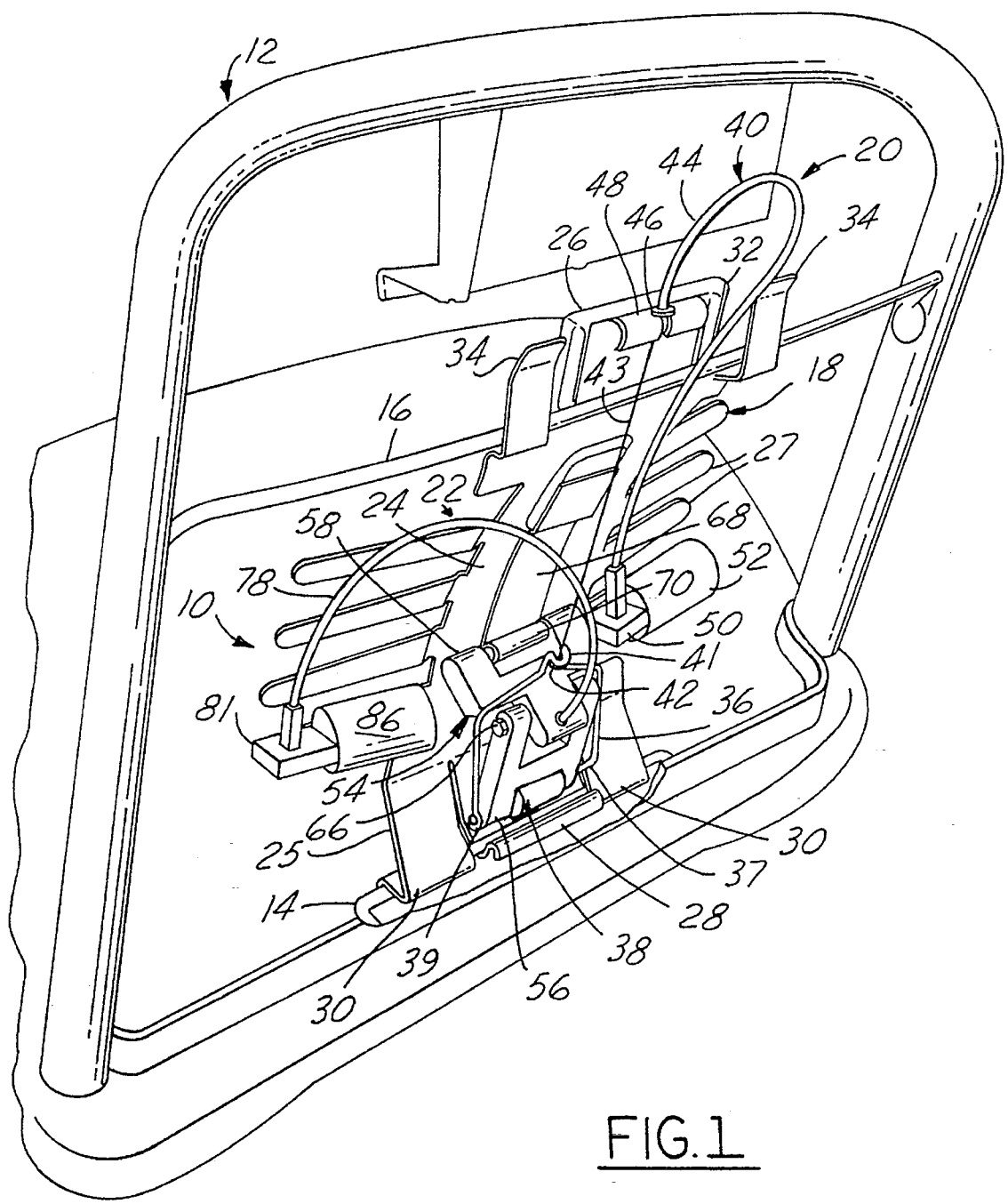
FIG. 1 is a perspective view of a four-way lumbar support in a seatback frame.
Figure 2:
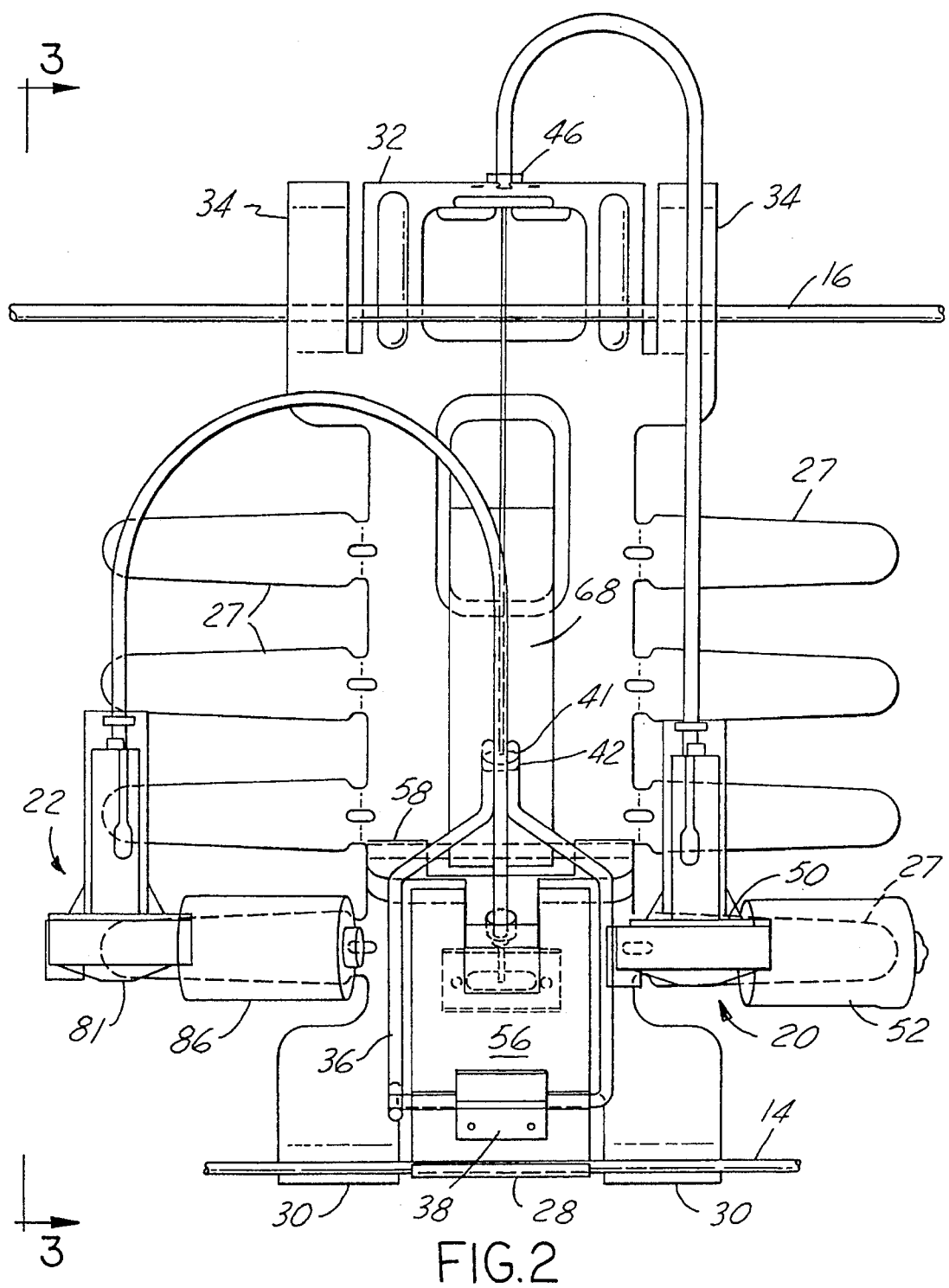
FIG. 2 is a rear view of the four-way lumbar support and seatback frame of FIG. 1.

A four-way lumbar support 10 as shown in FIGS. 1 and 2 is supported by a seatback frame 12 having a first or lower horizontally disposed bar 14 and a second or upper horizontally disposed bar 16 engaging opposite ends of four-way lumbar support 10. A flexible single piece support member 18 is engaged by means for longitudinally subtending 20 and an apex shift mechanism 22.

The single piece support member 18 has a central body 24 with a first or lower longitudinal end 25 pivotably attached to first horizontally disposed bar 14, and a second longitudinal end 26 slidably engaging second horizontally disposed bar 16. Four support fingers 27 extend transversely outwardly from each side of central body 24. Of course support member 18 may have more or fewer support fingers 27 depending upon the specific seat configuration. First longitudinal end 25 includes an inside clamping member 28 and outside clamping member 30, best shown in FIGS. 2 and 3. Inside clamping member 28 and outside clamping member 30 deflect from a first position, shown in phantom in FIG. 3, to receive first horizontally disposed bar 14 and deflect to the second position, shown in solid lines, trapping bar 14 and thereby providing pivotable engagement between first longitudinal end 25 and first horizontally disposed bar 14.

Figure 3:
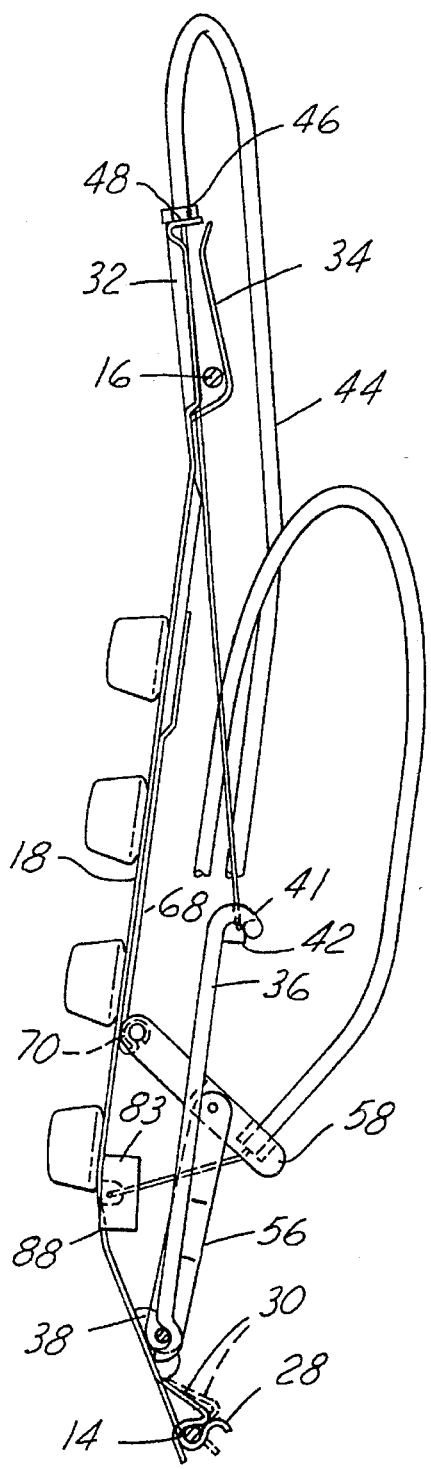
FIG. 3 is a side view of the four-way lumbar support of FIG. 1 adjusted to provide minimal lumbar support.
Figure 4:
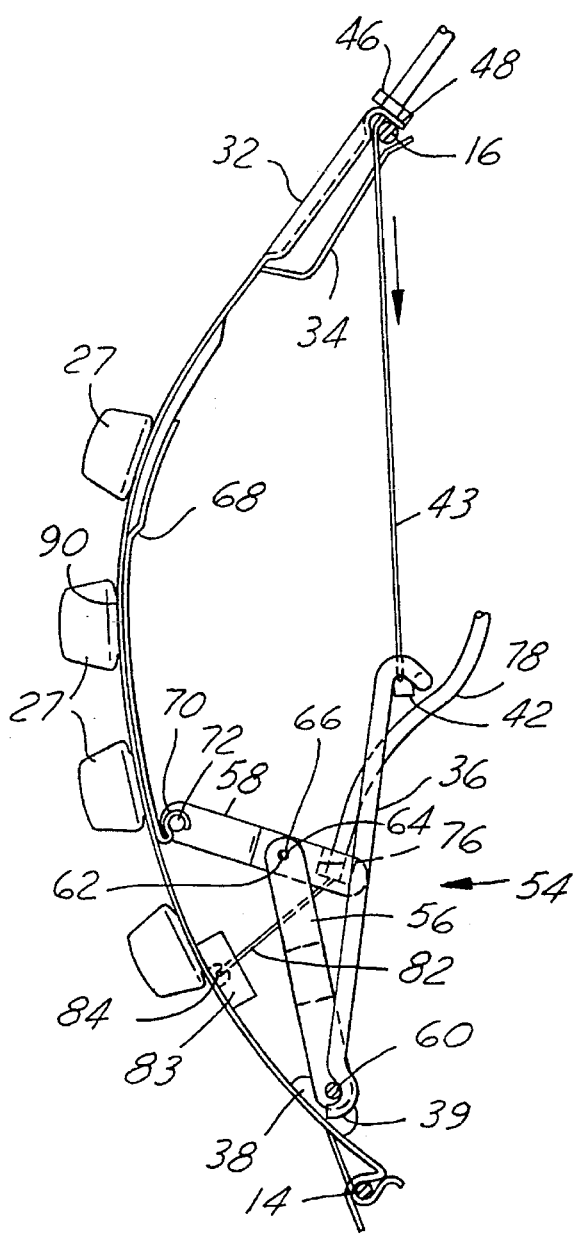
FIG. 4 is a side view of the four-way lumbar support of FIG. 1 adjusted to provide maximum lumbar support at a first or lowest apex vertical position.
Figure 5:
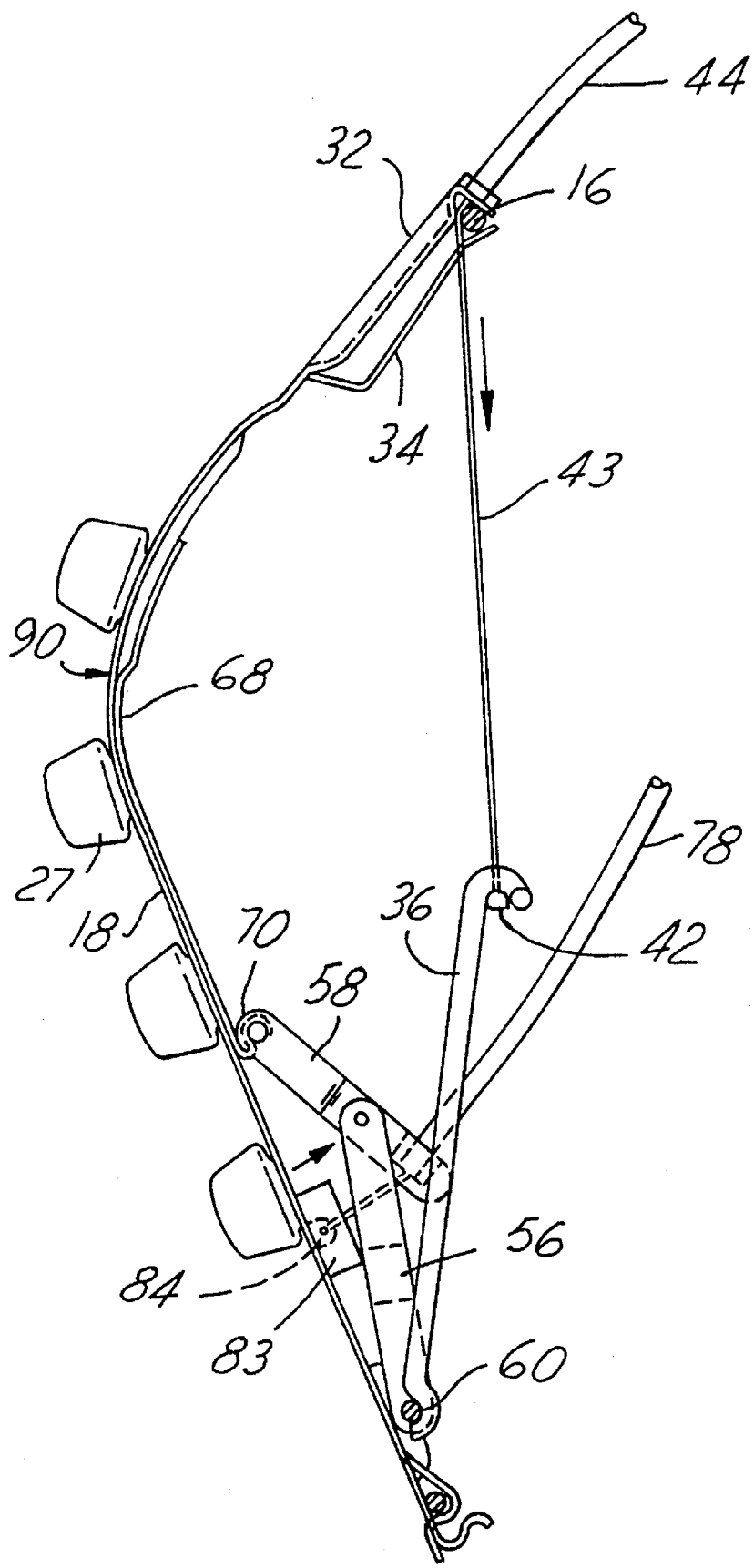
FIG. 5 is a side view of the four-way lumbar support of FIG. 1 adjusted to provide maximum lumbar support with the apex adjusted to a second or maximum vertical position.

Second longitudinal end 26 has inside holding member 32 and outside holding members 34 engaging second horizontally disposed bar 16. Inside holding member 32 and outside holding members 34 are spaced apart from each other as shown in FIGS. 3–5 a distance approximately equal to a diameter of second horizontally disposed bar 16, enabling sliding movement of second longitudinal end 26 relative to second horizontally disposed bar 16 a distance approximately equal to the length of outside holding member 34.

A subtending yoke 36 has a lower side 37 passing through an aperture in a bottom anchor 38 which is fixed to inside clamping member 28, thereby pivotably attaching yoke 36 to support member 18. Subtending yoke 36 has an engaging hook 39 on one side which engages a free end of lower side 37 to enable both sides of yoke 36 to react against lower side 37 when the yoke sides are in tension.

A subtending cable assembly 40 engages a U-shaped slot 41 in yoke 36 with a cable end 42 of a subtending cable 43. A subtending cable housing or sheathing 44 encloses a portion of subtending cable 43 and extends from a first reinforcing sleeve 46 engaging a tab 48 of inside holding member 32 to an actuator housing 50 including an electric drive motor 52.

Apex shift mechanism 22 includes an apex shift linkage 54 having an H-shaped first shift link 56 pivotably connected at a hinge point to a Y-shaped second shift link 58. A lower portion of first shift link 56 straddles bottom anchor 38 and has a first aperture 60 which receives lower side 37 of yoke 36. Free end of lower side 37 is removed from connecting hook 39 and passes through the aligned first aperture 60 and bottom anchor aperture to pivotably connect first shift link 56 with support member 18. An upper portion of first shift link 56 captures a lower end of second shift link 58 and has a second aperture 62 aligned with a first aperture 64 through the lower end of second shift link 58. A pin 66 passing through apertures 62 and 64 defines the hinge point or rotational joint between first and second shift links 56 and 58. The rotational joint can alternatively be provided any other suitable structure, such as a snap-in feature with a pair of engaging bumps and dimples. A reinforcing stamping 68 fixed to support member 18 includes a snap mount 70 which receives an upper pin 72 disposed between open arms of second shift link 58 for pivoting within the snap mount 70.

A cable aperture in second shift link 58 located opposite the hinge point from support member 18 receives a cable housing 78 of apex shift cable assembly 80. Cable housing 78 extends to an apex shift actuator housing 81. An apex shift cable 82 is disposed within cable housing 78 and extends beyond cable housing 78 to engage a molded cable anchor 83 fixed to support member 18 which receives a cable end 84. Molded cable anchor 83 is fixed to support member 18 at a location between bottom anchor 38 and snap mount 70 and proximate to a preformed bend 88 in support member 18 bowing outward away from apex shift linkage 58. An exposed length of cable 82 extending beyond cable housing 78 to cable end 84 is varied in length by actuator 81 with the energization of an electric drive motor 86.

The two actuator/drive motor combinations, 50, 52 and 81, 86 are mounted to the lowermost of the support fingers 27 in the embodiment shown. However, it is anticipated that the actuator/drive motor combinations could be mounted elsewhere, as may be required for the particular seat into which the lumbar support is to be placed. While electric drive motors are shown in the present embodiment, it should be appreciated that other drive means, such as hand operated cable displacement mechanisms, can be substituted.

The four-way lumbar support operates in the following manner. The four-way lumbar support 10 as shown in FIG. 3 is effectively providing no enhancement of lumbar support. Support member 18 is essentially undeflected from its unloaded shape. By displacing cable 43 to shorten the length of cable 43 disposed between the U-shaped slot 41 in yoke 36 mad the cable housing 44, support member 18 bows outward, defining an outermost point, or apex 90 at the support finger 27 which is second from the top. It is understood that the precise location of apex 90 is merely exemplary and will vary with the specific design of the lumbar support 10. As the exposed cable length is shortened, second longitudinal end 26 slides along second horizontally disposed bar 16 as first longitudinal end 25 pivots about first horizontally disposed bar 14 until second horizontally disposed bar 16 is engaged by tab 48 to prevent further displacement.

The apex 90 is shifted upward and made more pronounced by shortening the length of exposed cable 82. Energization of drive motor 86 results in a shortening of the portion of apex shift cable 82 exposed between cable housing 78 and molded cable anchor 83. The change in length occurs with the pivoting of first shift link 56 relative to second shift length 58, increasing the angle therebetween and likewise increasing a distance between bottom anchor 38 and snap mount 70 which tends to straighten out a stamped or preformed bend 88.

The amount of bowing can be varied between the minimum and maximum shown in FIGS. 3 and 4 respectively by merely varying the displacement of cable 43 adjusting the exposed length of cable 43 to an intermediate length to provide the amount of bowing desired. Reversal can be achieved by reversing the change in exposed cable length. Similarly, the adjustment of the location of apex 90 can be controlled between that shown in FIGS. 4 and 5 by controlling the exposed length of cable 82. The apex 90 is shifted upward by shortening the exposed length of cable 82. The apex is shifted downward by increasing the exposed length of cable 82.

The preceding description is exemplary rather than limiting in nature. A preferred embodiment was disclosed to enable a skilled artisan to practice the invention. Modifications are possible without departing from the purview and spirit of the present invention, the scope of which is limited only by the following claims.

We claim:

1. A lumbar support mechanism comprising:

a flexible support member having oppositely disposed first and second longitudinal ends;

means disposed between the first longitudinal end and the second longitudinal end for longitudinally subtending the support member, whereby the support member arches outwardly to define an apex engaging a user's back; and an apex shift linkage including a first shift link and a second shift link with the first shift link having a first end thereof pivotably connected to the flexible support member proximate to the first longitudinal end and the second shift link pivotably connected on a first end thereof to the flexible support at a point between the second longitudinal end and the first end of the first apex shift link and the second apex shift link also being pivotably connected to the first apex shift link at a hinge point wherein the first apex shift link and the second apex shift link define an angle therebetween; and a loading means engaging one of the first shift link and the second shift link at a load point wherein applying a load at the load point tends to shift the apex toward the second longitudinal end.

2. A combination as claimed in claim 1 wherein the loading means is a cable assembly engaging the linkage at the load point.

3. A combination as claimed in claim 2 wherein the cable assembly has a housing engaging the linkage at the load point and an end of a cable extends from the cable housing and is fixed to a reaction element.

4. A combination as claimed in claim 3 wherein the reaction element is the flexible support member.

5. A combination as claimed in claim 1 wherein the flexible member has a preformed bend therein disposed between the points of engagement with the linkage.

6. A combination as claimed in claim 1 wherein the load point is opposite the hinge point from the flexible support member.

7. A combination of a lumbar support mechanism and a frame for a seatback comprising:

a first horizontally disposed bar fixed to the frame;

second horizontally disposed bar fixed to the frame and spaced from the first horizontally disposed bar;

a flexible support member having oppositely disposed first and second longitudinal ends, the first longitudinal end being rotatably attached to the first horizontally disposed bar and the second longitudinal end slidably connected to the second horizontally disposed bar;

means disposed between the first longitudinal end and the second longitudinal end for longitudinally subtending the support member, whereby the support member arches outwardly to define an apex engaging a user's back; and an apex shift linkage including a first shift link and a second shift link with the first shift link having a first end thereof pivotably connected to the flexible support member proximate to the first longitudinal end and the second shift link pivotably connected on a first end thereof to the flexible support at a point between the second longitudinal end and the first end of the first apex shift link and the second apex shift link also being pivotably connected to the first apex shift link at a hinge point wherein the first apex shift link and the second apex shift link define an angle therebetween; and a loading means engaging one of the first shift link and the second shift link at a load point wherein applying a load at the load point tends to shift the apex toward the second longitudinal end.

8. A combination as claimed in claim 7 wherein the loading means is a cable assembly engaging the linkage at the load point.

9. A combination as claimed in claim 8 wherein the cable assembly has a housing engaging the linkage at the load point and an end of a cable extending from the cable housing engages a reaction element.

10. A combination as claimed in claim 9 wherein the reaction element is the flexible support member.

11. A combination as claimed in claim 7 wherein the flexible member has a preformed bend therein disposed between the points of engagement with the linkage.

12. A combination as claimed in claim 7 wherein the load point is opposite the hinge point from the flexible support member.

* * * * *